United States Patent [19]

Takahashi et al.

[11] Patent Number: 4,713,698
[45] Date of Patent: Dec. 15, 1987

[54] WRITE-IN ELECTRONIC DISPLAY RECORDER

[75] Inventors: Teruomi Takahashi, Urayasu; Tadashi Sato, Kokubunji, both of Japan

[73] Assignee: Canon Kabushiki Kaisha, Tokyo, Japan

[21] Appl. No.: 896,226

[22] Filed: Aug. 14, 1986

[30] Foreign Application Priority Data

Aug. 19, 1985 [JP] Japan ................. 60-181250

[51] Int. Cl.$^4$ ............ H04N 1/21; G09G 3/26; G01D 9/00; G01D 15/06
[52] U.S. Cl. .................... 358/296; 340/792; 346/21; 346/153.1
[58] Field of Search ............ 346/21, 153.1, 160; 340/706, 792, 825.26; 358/296, 300, 301

[56] References Cited

U.S. PATENT DOCUMENTS 4,547,787 10/1985 Kaneko et al. ............. 340/792 X
4,647,982 3/1987 Aoi ........................ 346/153.1

FOREIGN PATENT DOCUMENTS 0000449 1/1980 Japan ....................... 346/21

*Primary Examiner*—E. A. Goldberg
*Assistant Examiner*—Patrick W. Foster
*Attorney, Agent, or Firm*—Fitzpatrick, Cella, Harper & Scinto

[57] ABSTRACT

A recorder has functions of optically reading image information drawn on a board (record medium), converting the image information to an electrical signal, recording the image information on a record sheet by record means, optically reading a document sheet separately, and outputting the document image onto the board. Further, another image information may be drawn over the image information on the board, and the composite image may be read and recorded on a record sheet.

11 Claims, 12 Drawing Figures

WRITE-IN ELECTRONIC DISPLAY RECORDER

BACKGROUND OF THE INVENTION

1. Field of the Invention

The present invention relates to an electronic display recorder having a display board similar to a blackboard used in a conference or meeting.

2. Related Background Art

In a conventional electronic blackboard, information drawn on a blackboard (or whiteboard) is digitally converted by photo-electric conversion elements and output in the form of hard copy by thermal record means. In another conventional electronic blackboard, an electrophotographic type copying machine is used to expose an image on the blackboard onto a drum by an optical system so that it is copied onto plain paper. The latter recorder is disclosed in Japanese Patent Application Laid-Open No. 164770/1985.

However, those recorders have only a function to copy the information on the blackboard. In a conference, when a data which is in an attendant's hand is to be discussed, the contents of the data must be written on the blackboard. In such a case, the efficiency of the conference falls even if the electronic blackboard is used.

SUMMARY OF THE INVENTION

It is an object of the present invention to provide a recorder having high usability and functions which the conventional recorders could not attain.

It is another object of the present invention to provide a recorder which contribute to improve an efficiency of conference or meeting.

It is another object of the present invention to provide a recorder which can display a document image in an enlarged scale and permits addition and correction of image information.

In order to achieve the above objects, the recorder of the present invention comprises a sheet-like board member movably supported by a plurality of rollers, drive means for driving at least one of the rollers to move the board member, means for optically reading image information drawn on the board member and converting the read signal to an electrical signal, record means for recording an image corresponding to the converted electrical signal onto a record sheet, means for reading image information other than that drawn on the board member and converting the read signal to an electrical signal, and record means arranged to face the board member for recording image information corresponding to the electrical signal onto the board member as visual information.

In accordance with the electronic display recorder of the present invention, information on a document sheet is read and reproduced on the board. Additional information may be written by a sign pen or the like, or unnecessary information may be erased, and the image information finally left on the board is recorded on the record sheet.

The board member may be an ended or an endless sheet-like member made of synthetic resin of white, faint, black or blue color. The means for reading the information on the board member or the document sheet may be CCD elements, and the means for forming the visible image on the board member or the record sheet may be electrostatic recorder, thermal recorder or ink recorder. In the following description, the board member is referred to as record medium or blackboard for the sake of convenience.

DETAILED DESCRIPTION OF THE PREFERRED EMBODIMENTS

Figure 1:
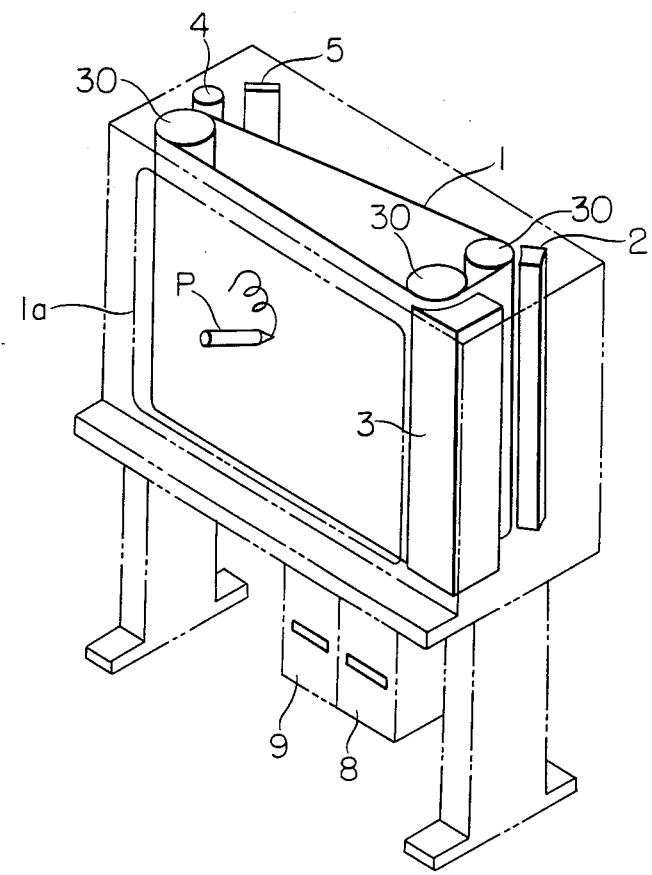
FIG. 1 is a perspective view of one embodiment of the present invention.

FIG. 1 shows a perspective view of one embodiment of the present invention. The apparatus comprises a blackboard image recorder unit which includes a record medium 1, a toner supplier 2 and blackboard image record means 3, a first reader unit for reading an image on the blackboard (record medium) 1 which includes a light source 4, a mirror 5, a lens 6 and a photo-electric converter 7, a second reader unit 8 for reading an image on a document sheet, and a printer unit 9 for reading an image drawn on the blackboard and recording it to a record sheet in response to a signal from the first reader unit. Numeral 1a denotes a display area of the apparatus.

Figure 2:
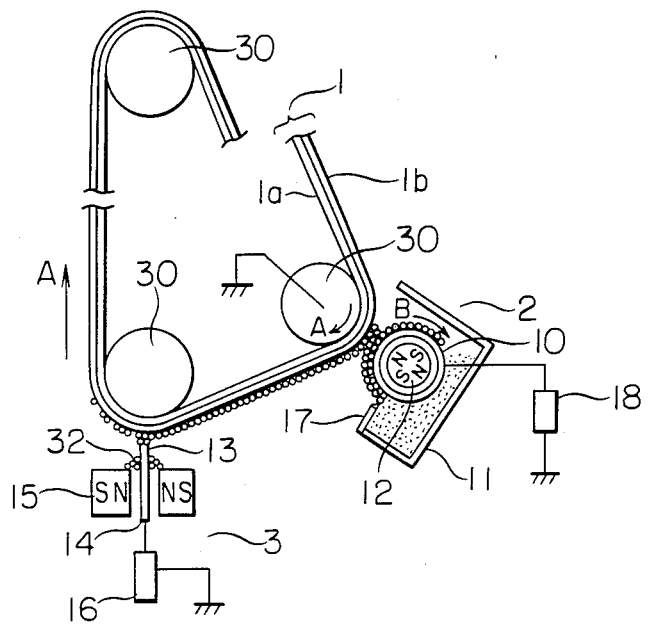
FIG. 2 shows a construction of a blackboard image recorder.

FIG. 2 is a plan view showing a detail of the blackboard image recorder unit. Numeral 10 denotes a rotatable toner supply roller made of a non-magnetic cylinder mounted in a conductive and magnetic toner container 11, and numeral 12 denotes a magnet roller mounted in the toner supply roller 10. A periphery thereof is alternately magnetized with opposite polarities at a constant circumferential pitch. The record medium 1 is arranged to face the toner supply roller 10 and comprises a conductive base member 1a, a dielectric layer 1b, and a dielectric protective layer as required, in a laminated structure. A recording electrode 14 may be formed by axially arranging a number of rods of a small diameter made of magnetic material such as iron, permalloy or nickel, in parallel to face the record medium, or it may be formed from a magnetic sheet by etching or plating. It is fixed and electrically insulated by an insulative member (not shown) and it is sandwiched by magnets 15 to form the blackboard recorder 3. The recording electrodes 14 are independently connected to a signal generator 16.

A principle of image formation by the record means is disclosed in U.S. Pat. No. 3,946,402 and it is therefore not explained here in detail.

The record medium 1 is supported by three parallel rollers 30 and driven by a pulse motor M of a drive source in a direction A and passes near the toner supply roller 10, which is driven in a direction B by a drive source (not shown). The toner in the toner container 11 is held on the toner supply roller by a magnetic field action, and a uniform toner layer is formed by a doctor blade 17. When the toner contacts the record medium 1, it is charged because a D.C. voltage is applied thereto from a bias power supply 18, and it deposits onto the record medium 1. The toner is usually conductive and magnetic toner.

As the record medium 1 further rotates in the direction A and the toner T thereon reaches a record position 13, a chain of the toner T is formed between the record medium 1 and the recording electrodes 14 under the influence of the magnetic field created by the magnets 15. Most of the charges of the toner are lost through the dielectric layer 16 before the toner reaches the record position 13. Accordingly, at the record position, the deposition force of the toner T to the record medium 1 is weak. However, as the signal generator 16 applies, at this moment, a record signal voltage selected in accordance with the image pattern to the recording electrodes 14, charges of the polarity opposite to that of the charges on a backing electrode roller 31, which is disposed at a back side of the dielectric layer 1b, are provided into the toner T through the chains of the toner T formed between the recording electrodes 14 to which the signal voltages are applied, and the record medium 1. Those charges impart an electrical force sufficient to deposit the toner T to the record medium 1. On the other hand, on the electrodes to which the record signal voltages are not applied (non-image areas), charges are not injected and the deposition force between the record medium 1 and the toner T is weak as described above. Accordingly, the toner T is attracted by the magnetic field created by the magnets 15 and deposited and accumulated in a vicinity 32 of the magnets 15 along the recording electrodes 14.

Figure 4:
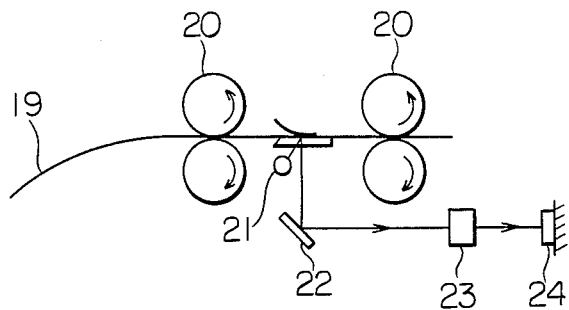
FIG. 4 shows a construction of a reader.

In this manner, a toner image is formed on the record medium 1, that is, a visible image is recorded on the blackboard. The thus formed image is recorded in accordance with the picture information representing the image on the document sheet read by the reader 8 as being the second read means. As shown in FIG. 4, the reader 8 comprises two pairs of feed rollers 20 driven by a drive source (not shown) for feeding the document sheet 19 inserted into the reader 8, a lamp 21 for illuminating the document sheet, a mirror 22 for picking up a reflected light from the document sheet, a lens 23 and a photo-electric converter 24 such as CCD elements having 2560-bit fine photo-sensing elements for converting light information to an electrical signal. The photo-electric converter can read a document of A4 width and convert it to a digital signal with a resolution of 8 dots/mm.

The first read means for reading the toner image on the blackboard (or whiteboard) recorded the blackboard image record means or the image on the blackboard by a felt pen or the like is now explained.

Figure 3:
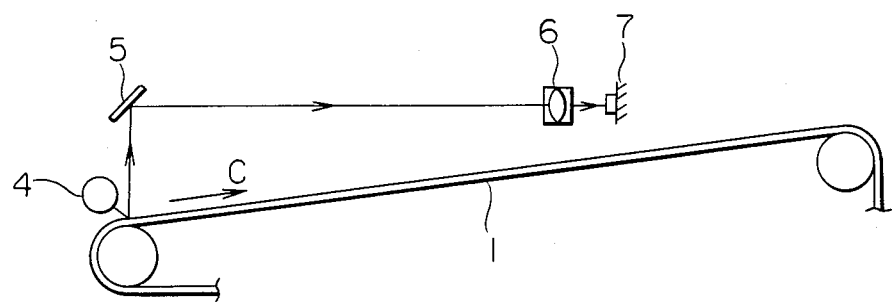
FIG. 3 shows a construction of a blackboard image reader.

FIG. 3 shows a construction of the blackboard image read means. The picture image on the record medium 1 is illuminated by the lamp 4, and a light reflected thereby passes through the mirror 5 and the lens 6, and is directed to the photo-electric converter 7, which decomposes the picture information into pixels of 1 dot/mm to produce a digital signal. The record medium 1 is driven in a direction C by a drive motor M at a read timing of the photo-electric converter 7.

The image signal read by the blackboard image read means is recorded on a thermal record sheet 26 by the printer 9.

Figure 5:
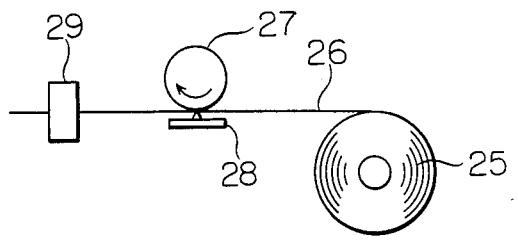
FIG. 5 shows a construction of a printer.
Figure 6:
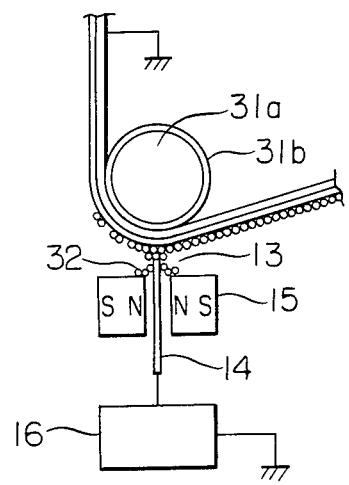
FIG. 6 shows a modification of the blackboard image recorder.

The printer 9 may be thermal record means which uses a thermal record sheet used in a facsimile machine. FIG. 5 shows a construction thereof. The record sheet 26 supplied from a supply roll 25 is fed by a feed roller 27 driven by a drive source (not shown). Recording on the record sheet is done by a conventional thermal head 28 which is driven in accordance with the blackboard image read signal to record the image on the thermal record sheet.

Figure 7:
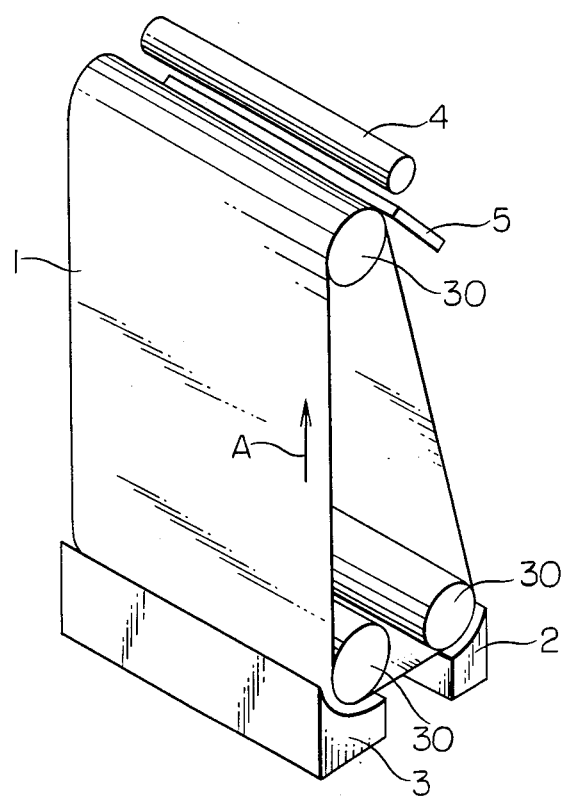
FIG. 7 is a perspective view of another embodiment of a method for driving a record medium.

Another embodiment of the apparatus is now described. The record medium 1 may be moved vertically as shown in FIG. 7 instead of horizontally shown in FIG. 1. When the toner is used to form the visible image on the record medium, the stability in the feed of the toner is assured by the vertical movement of the record medium 1.

Figure 8:
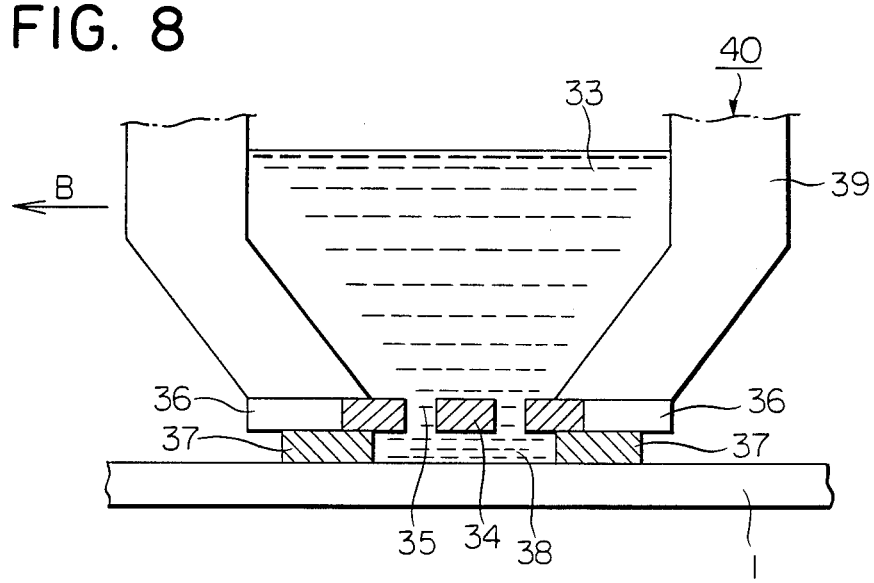
FIG. 8 illustrates a principle of another embodiment of a write head.

In another embodiment of the image record means 3, a record head 40 may be used. FIG. 8 shows a partial enlarged view of the head and FIG. 9 shows a partial perspective view of a head end.

Numeral 40 denotes the record head which contains in a housing 39 thermo-fusable (including softening and sublimation) ink 33 which is semi-solid and maintains a high viscosity at a room temperature and a low viscosity at a high temperature.

Figure 9:
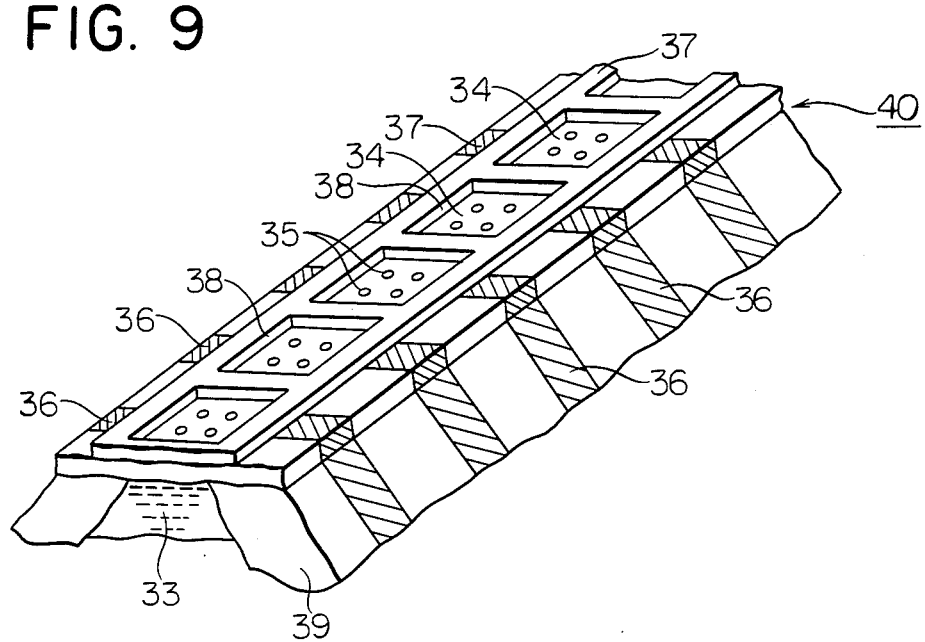
FIG. 9 is an enlarged perspective view of a leading end of the head.

Heaters 34 made of carbon resistors are arranged on the housing 39 at a pitch of 1 mm as shown in FIG. 9. Each heater 34 has four ink apertures 35 having a diameter of 0.2 mm.

Connected to the heaters 34 are aluminum electrodes 36 adapted to be energized in accordance with the image signal so that the heaters 34 are individually heated by selectively applying voltages to the electrodes 36.

The heaters 34 have frame-shaped spacers 37 made of fluoride resin as shown in FIG. 9. The spacers 37 have a thickness of 0.05 mm and are of frame shape so that ink reservoirs 38 of 0.8 mm×0.8 mm in size are arranged on the heaters 34.

The ink 33 may typically be thermo-fusable ink having coloring agent dispersed or dissolved in thermo-fusable binder. Elastomer is added to the thermo-fusable binder to adjust fusing viscosity and adhesive force. One or more binders such as natural or synthesized wax resins are used as the thermo-fusable binder.

The coloring agent may be pigment such as carbon black used in printing or other recording method, and one or more pigments may be used. A proportion of the coloring agent is preferably 1–40 precent by weight of the ink. The ink need not be semi-solid at a room temperature but it may be paste or have a high viscosity.

A principle of image formation by the head 40 is described. A picture information of a document sheet is read by the reader 8 in a manner shown in FIG. 4 and it is converted to a digital electric signal. A record voltage corresponding to the electrical signal is sent to the head 40 and voltages are applied to the heaters 34 of the head 40 in accordance with the read signal. The heaters 34 are selectively heated and the viscosity of the semi-solid ink 33 in the ink reservoirs 38 is reduced by the heat and the ink 33 is removed from the ink reservoirs 38 and moves onto the record medium 1. The record medium 1 is moved in the direction A in FIG. 1 as the ink moves to the record medium 1. As a result, the document image read by the reader 8 is displayed in an enlarged scale on the entire plane of the record medium.

If the ink reservoirs 38 are empty as the recording proceeds, the ink 33 in the housing 39 whose viscosity has been lowered by the heat of the heaters 34 is supplied into the ink reservoirs 38 through the ink apertures 35 and it is semi-solidified by heat dissipation when the ink spreads into the ink reservoirs 38.

The record means 2 and 3 (FIG. 1) to the record medium 1 and the means 40 (FIG. 8) record the document image read by the reader 8 onto the record medium 1 as the record medium 1 is moved.

In an alternative of the record means 2, 3 and 40, the record means may be movable along the record medium 1 and the document image may be recorded on a nondisplay area of the record medium 1 while the record medium 1 is used for display. The document image may be read at any time and the enlarged document image can be displayed by moving the recorded medium 1. Thus, high speed exchange of image is attained.

Figure 10:
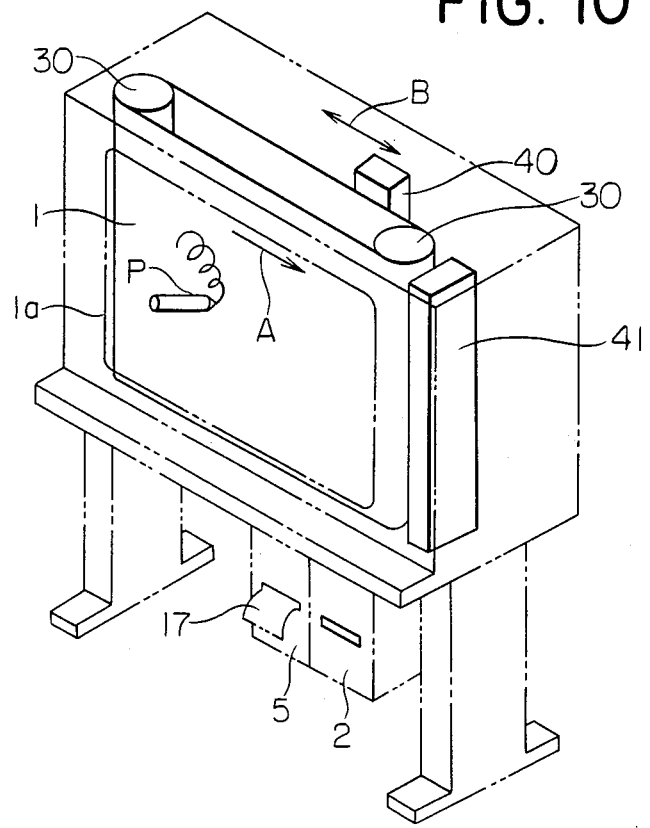
FIG. 10 is a perspective view of another embodiment of the apparatus.

FIG. 10 is a perspective view of a display recorder which can write any document image on the board as described above. The record medium 1 is supported by two rollers 30 and moved in a direction A. Read means 41 for picture information drawn on the record medium 1 is arranged downstream of a display area of the record medium 1.

Figure 11:
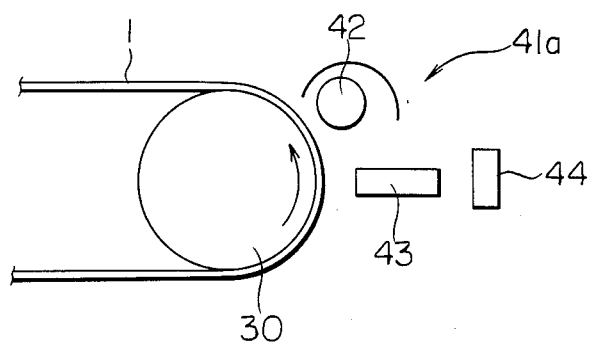
FIG. 11 is a plan view of another embodiment of the reader.

A reader 41 may be a proximate sensor which comprises an illumination optical system and photo-sensing elements divided transversely to the direction of movement of the medium 1 and reads the picture information on the medium 1 which is moved past the reader 41. Alternatively, it may comprise a light source 42, a focusing optical system having a short focus element array 43 and photo-sensing elements 44 such as CCD arranged along the optical system, as shown in FIG. 11.

Figure 12:
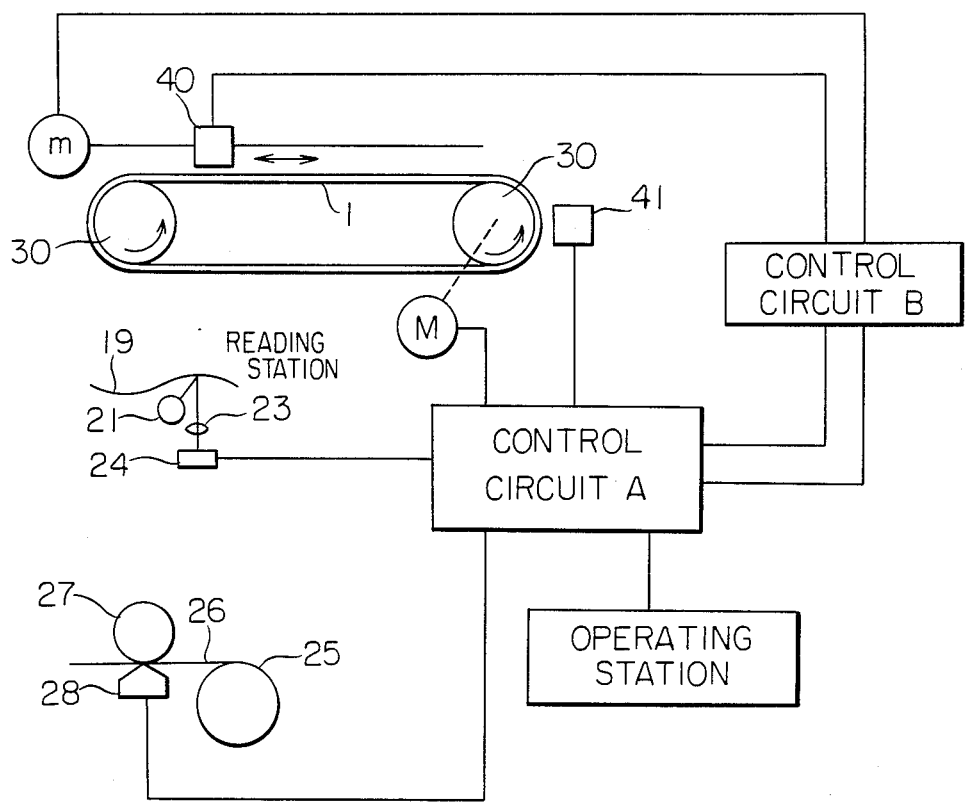
FIG. 12 is a block diagram of a control system.

FIG. 12 shows a control unit of the apparatus shown in FIG. 10. When the apparatus is used as a conventional electronic blackboard, the motor M is energized by a control circuit A by a record command from a console unit, and the reader unit records the image on the medium 1 onto the thermal sheet 26 by the thermal head 28 in accordance with the digital signal read by the reader 41. When the picture information on the document sheet 19 is to be written onto the medium 1, a write command is issued and the motor M is driven by a control circuit B to scan the record head 40 so that the picture information on the document sheet 19 is written in accordance with the digital signal produced by reading the document sheet 19. The drive motor M for the medium 1 is not energized at this time.

When the picture image on the medium formed by the write command is to be displayed, a display command is issued and the motor M is energized to move the picture image drawn on the medium 1 to the display position of the apparatus. The reader 41 and the thermal head 28 of the record means are disabled during this period.

When the picture information drawn on the medium 1 is to be corrected by addition or deletion and the final information is to be recorded as a hard copy, a record command is issued so that the synthesized image is recorded on the thermal sheet 26.

When the display command is issued, the medium 1 is moved but the reader 41 is disabled. During the execution of the write command, the record command is inhibited. If the writing of the document image is accompanied with the movement of the medium 1 as shown in FIG. 1, the record command is inhibited during the execution of the write command so that unintended recording of the displayed image information is prevented. The presence of the writing document at the reader may be detected by the detection means to automatically execute the write command, or to record on a record sheet by the record means 28 in accordance with the image information of any document.

The picture information recorded on the medium by the write command is an unfixed image and can be readily erased together with the picture information additionally written. In order to facilitate the erasing, the ink or toner used to write the information is to be properly selected and the material of the medium surface is also to be properly selected. A milky resin base film having a polyethylene film or fluoride film bonded thereon is useful as a easy-to-erase medium.

What we claim is:

1. An electronic display recorder capable of displaying and recording written image information, comprising:
    a sheet-like board member on which image information is to be written;
    support means for longitudinally movably supporting said board member;
    a drive source for driving said board member;
    first read means for reading the image information written on said board member;
    second read means for reading image information of a document sheet;
    means for writing the image information onto said board member in accordance with the image information read from said document sheet; and
    means for recording the image information read by said first read means.

2. An electronic display recorder according to claim 1, wherein said means for writing onto said board member is arranged to face said board member at a position off a display area of said board member.

3. An electronic display recorder according to claim 2, wherein said means for writing onto said board member is fixed to face the board member.

4. An electronic display recorder according to claim 3, wherein said means for writing onto said board member writes the information while said board member is moved.

5. An electronic display recorder according to claim 2 wherein said means for writing onto said board member is movably arranged along a surface of the stationary board member.

6. An electronic display recorder according to claim 2, wherein said means for writing onto said board member writes the information while said means is moving and the board member is stationary.

7. An electronic display recorder according to claim 1, wherein said first read means simultaneously reads the image information written by said write means and manually written image information.

8. An electronic display recorder capable of displaying and recording written image information, comprising:
    an endless sheet-like board member on which image information is to be written;
    support means for longitudinally movably supporting said board member;
    a drive source for driving said board member;
    first read means for reading the image information written on said board member;

second read means for reading image information of a document sheet;

write means arranged to face said board member at a position outside of a display area of said board member for writing image information onto said board member in accordance with the image information read from the document sheet; and means for recording the image information read by said first read means.

9. An electronic display recorder capable of displaying and recording written image information, comprising:

a sheet-like board member on which image information is to be written;

support means for longitudinally movably supporting said board member;

a drive source for driving said board member;

first read means for reading the image information written on said board member;

second read means for reading image information of a document sheet;

write means for writing the image information onto said board member in accordance with the image information read from said document sheet; and record means for recording the image information read by said first read means;

a command for activating said write means being dominant to a command for activating said record means.

10. An electronic display recorder according to claim 9, wherein said record means outputs the image information read from the document sheet by said second read means.

11. An electronic display recorder according to claim 9, wherein said first read means simultaneously reads the image information written by said write means and manually written image information.

* * * * *

UNITED STATES PATENT AND TRADEMARK OFFICE
CERTIFICATE OF CORRECTION

PATENT NO. : 4,713,698

DATED : December 15, 1987

INVENTOR(S) : TERUOMI TAKAHASHI, ET AL.

It is certified that error appears in the above-identified patent and that said Letters Patent is hereby corrected as shown below:

On the Title Page, Item [75],
"Tadashi Sato, Kokubunji," should read --Tadashi Sato, Tokyo,--.

COLUMN 1

Line 33, "contribute" should read --contributes--.

COLUMN 3

Line 57, "recorded" should read --recording--.

COLUMN 6

Line 17, "a" should read --an--.
Line 48, "2 wherein" should read --2, wherein--.

Signed and Sealed this

Sixteenth Day of May, 1989

Attest:

DONALD J. QUIGG

Attesting Officer                Commissioner of Patents and Trademarks